(12) United States Patent
Kamatani

(10) Patent No.: US 6,529,469 B2
(45) Date of Patent: Mar. 4, 2003

(54) DATA RECORDING AND REPRODUCING METHOD FOR MULTI-LAYERED OPTICAL DISK SYSTEM

(75) Inventor: Yasuo Kamatani, Sagamihara (JP)

(73) Assignee: LaserDynamics, Inc. (JP)

( * ) Notice: Subject to any disclaimer, the term of this patent is extended or adjusted under 35 U.S.C. 154(b) by 0 days.

(21) Appl. No.: 09/949,689

(22) Filed: Sep. 10, 2001

(65) Prior Publication Data

US 2002/0006085 A1 Jan. 17, 2002

Related U.S. Application Data

(63) Continuation of application No. 09/670,890, filed on Sep. 28, 2000, now Pat. No. 6,339,568, which is a division of application No. 09/370,308, filed on Aug. 9, 1999, now Pat. No. 6,215,743, which is a continuation of application No. 08/720,531, filed on Sep. 30, 1996, now Pat. No. 5,982,723.

(51) Int. Cl.$^7$ ................................................. G11B 7/24
(52) U.S. Cl. ............................... 369/275.3; 369/30.04; 369/53.2
(58) Field of Search ............................ 369/30.04, 30.03, 369/30.07, 30.3, 32.01, 47.28, 47.29, 47.3, 47.31, 47.55, 53.2, 53.24, 53.34, 53.37, 53.41, 53.45, 124.06, 275.3

(56) References Cited

U.S. PATENT DOCUMENTS

| | | | | |
|---|---|---|---|---|
| 4,853,915 A | * | 8/1989 | Takasago et al. | 369/53.31 |
| 5,010,539 A | * | 4/1991 | Terashima et al. | 369/47.41 |
| 5,177,728 A | * | 1/1993 | Otsubo et al. | 369/47.24 |
| 5,249,170 A | * | 9/1993 | Yoshimaru et al. | 369/47.54 |
| 5,289,451 A | * | 2/1994 | Ashinuma et al. | 369/53.22 |
| 5,315,570 A | * | 5/1994 | Miura et al. | 369/47.24 |
| 5,436,878 A | * | 7/1995 | Yamaguchi et al. | 369/53.2 |
| 5,715,355 A | * | 2/1998 | Yonemitsu et al. | 369/275.3 |

* cited by examiner

Primary Examiner—Paul W. Huber
(74) Attorney, Agent, or Firm—Trop, Pruner & Hu, P.C.

(57) ABSTRACT

A data recording and reproducing method for an optical disk data storage system to record data compressed at different data compression rate according to an operator's specification, and to reproduce the recorded data by decompressing. According to the operator's indication, the data is recorded at certain data compression rate in indicated area. The information of the data compression rate and the recorded area is stored as a table of contents (TOC) data. The TOC data is reproduced and stored in a memory after the optical disk is loaded. The recorded data is reproduced by selecting a decoding circuit to decompress the data. The decoding circuit is selected by referring the TOC data to identify data compression rate of the recorded data. Also the TOC data is referred to identify read-in and read-out region of the recorded data. The position of a pick-up when the data recording is started and ended, is recorded as the TOC data to provide random access capability for the data reproduction.

18 Claims, 3 Drawing Sheets

DATA RECORDING AND REPRODUCING METHOD FOR MULTI-LAYERED OPTICAL DISK SYSTEM

This is a continuation of U.S. patent application Ser. No. 09/670,890, now U.S. Pat. No. 6,339,568 entitled, "DATA RECORDING AND REPRODUCING METHOD FOR MULTI-LAYERED OPTICAL DISK SYSTEM," filed Sep. 28, 2000, granted on Jan. 15, 2002, which is a divisional of application Ser. No. 09/370,308, filed Aug. 9, 1999, now U.S. Pat. No. 6,215,743 entitled, "DATA RECORDING AND REPRODUCING METHOD FOR MULTI-LAYERED OPTICAL DISK SYSTEM," granted on Apr. 10, 2001, which is a continuation of application Ser. No. 08/720,531, filed Sep. 30, 1996, now U.S. Pat. No. 5,982,723 entitled, "DATA RECORDING AND REPRODUCING METHOD FOR MULTI-LAYERED OPTICAL DISK SYSTEM," granted on Nov. 9, 1999.

BACKGROUND OF THE INVENTION

1. Field of the Invention

This invention relates to an optical data recording and reproducing method. More specifically, this invention relates to an optical disk recording and reproducing method which makes possible to record data encoded by different encoding circuit at different data compression rate and to reproduce the data.

2. Description of the Prior Art

Initialized by the vast increase in information that needs to be processed, optical data storage system having become very important system particularly because of their high storage density per area. Most of the recent optical information storage systems rotating single optical disk are used on which the information is digitally stored in concentric circular tracks in an ordered, predefined manner to allow chronological fast reading and fast random access to desired pits of data.

In order to accomplish even more storage capacity of optical disk systems for enormous information processing, such as video or picture communication like so called video-on-demand service, multiple disk systems have been proposed. An optical disk system equipped with two or more data layers may in theory be accessed as different disks by changing the focal point with moving lens. Example of this type of state-of-the-art include U.S. Pat. No. 5,202,875 issued Apr. 13, 1993 to Rosen et al.; Japanese Published Application, 63-276732 published Nov. 15, 1988 by Watanabe, et al.

Such a multiple disk recording and reading system is applied to varied optical disk information storage systems. For example, a digital video disk (DVD) system for home entertaining is one of the typical application. The mentioned advantage of vast storage capacity may contribute especially for video signal transmission. In order to record the video data efficiently onto the optical disk, a video data compression technique is one of the key technologies. A standardized video data compression rate has been proposed, which is called MPEG (Moving Picture Experts Group). However, for the home entertaining purposes, a more flexible function is required. The ability to record data at different data compression rates and to reproduce the recorded data, must be provided.

3. SUMMARY OF THE INVENTION

The present invention has for its object to provide a multi-layered optical disk recording and reproducing system which is able to record data encoded by different encoding circuits at different data compression rates and to reproduce the data by a selected decoding circuit.

The object of the present invention can be achieved by an optical data recording and reproducing method, the recording method comprising the steps of: loading a multi-layered optical disk which has M data layers (wherein M is an integer greater than 1), receiving an operator's signal to record data on an Nth data layer of the multi-layered optical disk at a certain data compression rate (wherein N is an integer greater than 1 and not greater than M), operating a routing circuit to transmit the data to a determined encoding circuit in order to compress the data at a predetermined data compression rate, recording the data on predetermined position at the predetermined data compression rate, and rewriting table of contents (TOC) data to record data about the data compression rate of the newly recorded data.

And the object of the present invention also can be achieved by an optical data recording and reproducing method, the reproducing method comprising the steps of: loading a multi-layered optical disk, which has M data layers (wherein M is an integer greater than 1), reproducing a table of contents (TOC) data recorded in the multi-layered optical disk, storing the reproduced TOC data in a memory, receiving an operator's signal to reproduce selected data stored in the multi-layered optical disk, referring to the TOC data stored in the memory to identify the data compression rate of the selected data, and operating a routing circuit to transmit a readout signal of the selected data to the determined encoding circuit in order to decompress the selected data.

For a fuller understanding of the nature and advantages of the present invention, reference should be made to the following detailed description taken in conjunction with the accompanying drawings.

4. BRIEF DESCRIPTION OF THE DRAWINGS

5. DETAILED DESCRIPTION OF THE PREFERRED EMBODIMENT

Embodiments of the present invention will be explained with reference to the drawings.

Figure 1:
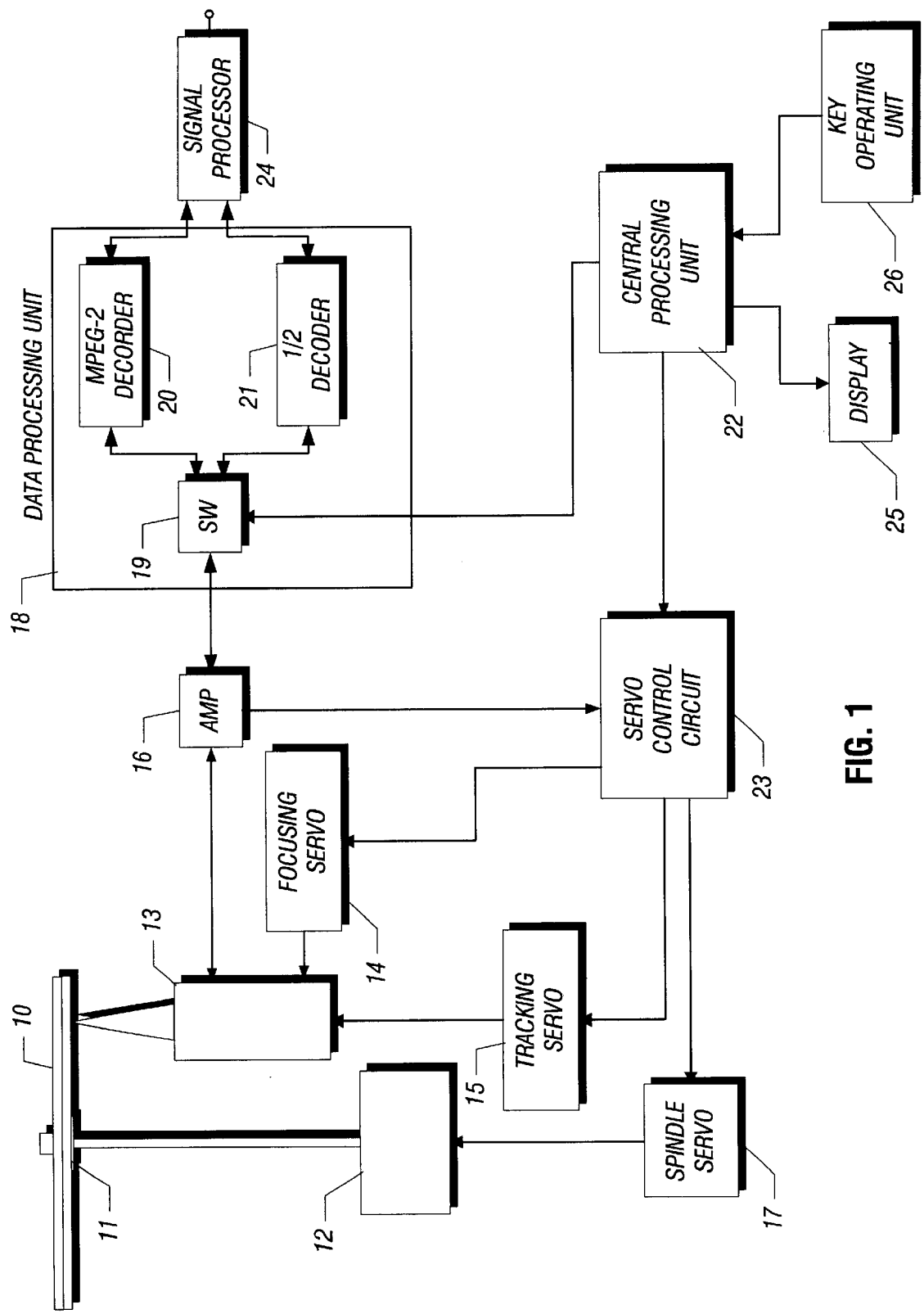
FIG. 1 shows a block diagram of an example of an optical data recording and reproducing apparatus to which the present invention can be applied.

FIG. 1 shows a block diagram of a first example of an optical data recording and reproducing apparatus to which the present invention can be applied. A digital video disk (DVD) 10 which has more than two data layers is mounted on and secured by a turntable 11 to be rotated by a spindle motor 12. Encoded pits on the DVD 10 are read by a pickup 13 which includes a laser diode, a focusing lens, a focusing lens actuator, a tracking actuator and a photo-detector. The movement of the pick-up 13 is controlled by a focusing servo circuit 14 and a tracking servo circuit 15.

To reproduce data encoded on the DVD 10, the output signal from the pickup 13 is transmitted to an amplifier 16. According to a focusing error signal, the focusing servo circuit 14 modulates the focusing lens actuator to move the focal point of the laser beam emitted from the laser diode by moving the focusing lens, to access one of the data layer of the DVD 10. And according to a tracking error signal, the tracking servo circuit 15 modulates the tracking actuator to control position of the pickup 13. The spindle servo circuit 17 modulates the spindle motor 12 in order to track linear velocity of the DVD 10.

The detected signal by the pick-up 13 is amplified by the amplifier 16. And the amplified signal is transmitted to a data processing unit 18 which is composed of a routing switch 19, an MPEG-2 decoder 20 and a ½ decoder 21. The MPEG-2 decoder 20 is a standardized data encoding or decoding circuit for a Digital Video Disk (DVD), provided in order to encode a data signal for recording on the disk and to decode the read out signal for signal processing. The ½ decoder 21 is a data encoding or decoding circuit provided to encode and compress the applied data signal to half data rate of the standardized DVD format. Due to the data compression by the ½ decoder 21, the quality of the data must be sacrificed in order to record longer data per recording area. However, it makes it possible to provide additional functionality and flexibility for the user. A set of TOC data encoded at a read-in region of the DVD 10, must include the data indicative of the starting and ending position of each data portion, and the data compression rate of each data. The TOC data is reproduced right after the DVD is loaded, and then the each data reproduction is preceded by referring the TOC data. And the TOC data must be rewritten after new data is recorded.

The routing switch 19 is operated by a central processing unit (CPU) 22 according to the detected TOC data, which includes the data indicating the compression rate of each data to determine the appropriate decoding circuit. The TOC data is also transmitted to a servo control circuit 23 which modulates the focusing servo circuit 14, the tracking servo circuit 15 and the spindle servo circuit 17. The servo control circuit 23 modulates each servo circuit to access selected data according to the TOC data which indicates the data indicating the starting and ending positions of each encoded data portion. Then the decoded signal is transmitted to a signal processor 24 to transmit the reproduced data signal to any connected unit, such as a display system or sound system. The CPU 22 is operated by an operation signal from a key operating unit 26 which transmits all operating signals input by an operator. The CPU 22 also controls a display unit 25 to show the operating status of the operator.

To record data onto the DVD 10, a portion of an input data signal is transmitted from the signal processor 24 to the chosen decoder in the data processing unit according to the operator's command. The input data signal is encoded by the selected decoder, then recorded by the pick-up 13 which is driven by the each servo circuit and the servo control circuit 23. After the new data is recorded on the DVD 10, the TOC data is rewritten to store the data indicating the position and data compression rate of the newly recorded data.

In addition, by storing the data of read-in and readout position of the all recorded data as TOC data, a capability of quick random access to any data portion is provided for the data reproduction process. For example, in order to reproduce one data and another data continuously, the pick-up head can rapidly switch access from readout region of the first data to the read-in region of the second data, if data as to all of the read-in region's position is stored and recorded in the TOC data. In the prior art system, all of the read-in region of the data between the first and second data must be counted by detecting the readout signal. For example, in order to reproduce both a $4_{th}$ data element and a $14_{th}$ data element recorded on the disk, the pick-up must detect and count ten read-in regions of the data between $4_{th}$ and $14_{th}$ data regions by moving the pick-up all over the disk. The present invention can provide the advantage of reproducing the data continuously without timelag. The advantage may contribute remarkably to the multi-layered optical disk reading systems which is equipped with more than two data layers.

Figure 2:
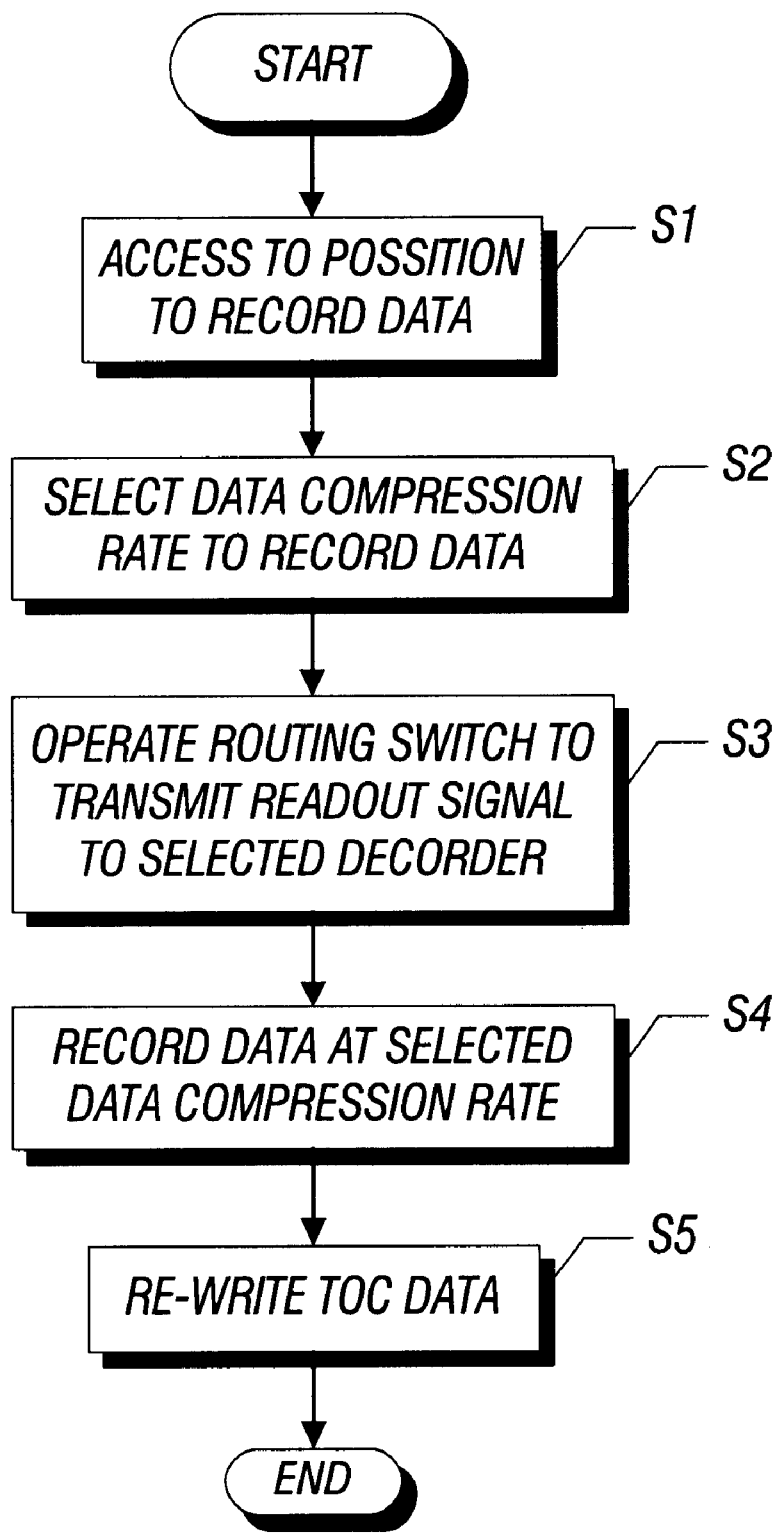
FIG. 2 shows a flowchart for a description of an optical disk recording method of the present invention.

FIG. 2 shows a flowchart of operation processing in a central processing unit (CPU), while recording data onto one data layer of a multi-layered optical disk. After a multi-layered optical disk which has M data layers (wherein M is an integer greater than 1) is loaded, the CPU receives an operator's signal to record data on the Nth data layer of multi-layered optical disk (wherein N is an integer greater than 1 and not greater than M). The CPU operates a servo control circuit to dispose a pick-up in order to access read-in region of the data to be recorded (Step 1:S1). According to the operator's selection of a data compression rate (S2), the CPU operates a routing circuit to transmit the data the determined encoding circuit in order to compress the data at the selected data compression rate (S3). The CPU operates a servo control circuit to record the data on a predetermined position at the predetermined data compression rate (S4). After the data recording is completed, the CPU operates a servo control circuit to rewrite a table of contents (TOC) data to record data indicating the data compression rate of the newly recorded data (S5).

Figure 3:
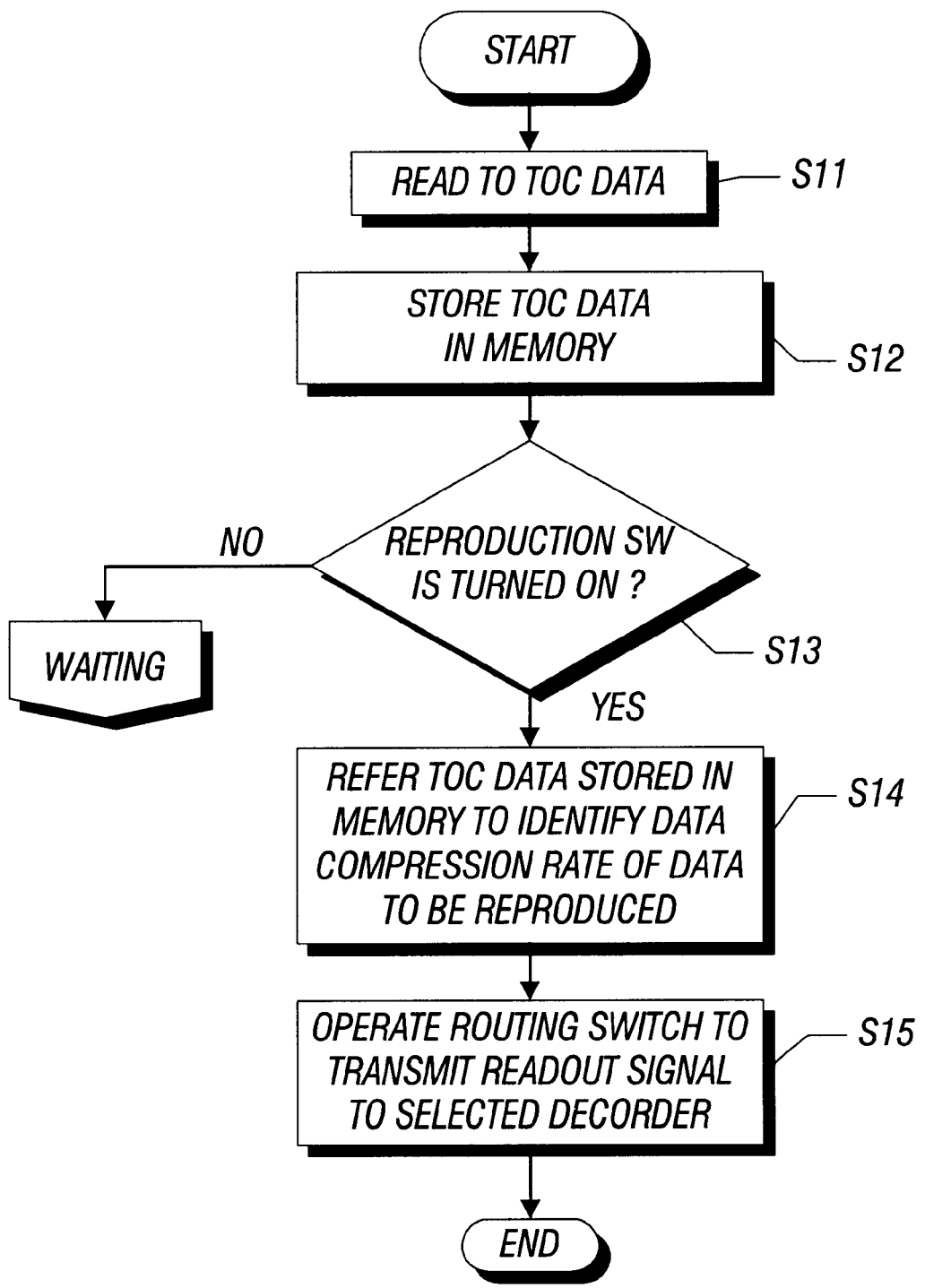
FIG. 3 shows a flowchart for a description of an optical disk reproducing method of the present invention.

FIG. 3 shows a flowchart of an operation processing with reference to the CPU, while reproducing data which is recorded by the procedure described in FIG. 2. After a multi-layered optical disk which has M data layers, wherein M is an integer greater than 1, is loaded, the CPU operates the servo control circuit to reproduce table of contents (TOC) data recorded in the multi-layered optical disk (S11). Then the CPU stores the reproduced TOC data in a memory (S12). When the CPU receives an operator's signal to reproduce certain data from the optical disk (S13), the CPU refers to the TOC data stored in the memory to identify the data compression rate of the selected data (S14). Then the CPU operates the routing switch to transmit a readout signal of the selected data to a determined encoding circuit in order to decompress the selected data (S15). After all of these procedures are completed, the data reproduction is started.

Although the invention has been particularly shown and described, it is contemplated that various changes and modification may be made without departing from the scope of the invention as set forth in the following claims.

What is claimed is:

1. An optical disk defining a recording region therein, the optical disk storing:

first control data indicative of a data transfer rate associated with the recording region;

second control data indicative of a recording density associated with the recording region; and third control data indicative of a location of the recording region.

2. The optical disk of claim 1, wherein the third control data indicates a starting position and an ending position of the recording region.

3. The optical disk of claim 1, wherein the optical disk further stores fourth control data, the fourth control data being indicative of layer information.

4. The optical disk of claim 1, wherein the data transfer rate and the recording density are associated with a data compression technique.

5. The optical disk of claim 1, wherein the optical disk comprises a read only optical disk.

6. The optical disk of claim 1, wherein the optical disk stores a set of encoded data in the recording region.

7. The optical disk of claim 6, wherein the set of encoded data includes moving picture data.

8. The optical disk of claim 6, wherein the set of encoded data includes sound data.

9. The optical disk of claim 1, wherein the optical disk comprises a recordable disk.

10. An optical disk defining a table of contents data region and a recording region therein, the optical disk storing:

first control data stored in the table of contents data region, the first control data being indicative of a data transfer rate associated with the recording region;

second control data stored in the table of contents data region, the second control data being indicative of a recording density associated with the recording region; and third control data indicative of a location of the recording region.

11. The optical disk of claim 10, wherein the third control data indicates a starting position and an ending position of the recording region.

12. The optical disk of claim 10, wherein the optical disk further stores fourth control data, the fourth control data being indicative of layer information.

13. The optical disk of claim 10, wherein the data transfer rate and the recording density are associated with a data compression technique.

14. The optical disk of claim 10, wherein the optical disk comprises a read only optical disk.

15. The optical disk of claim 10, wherein the optical disk stores a set of encoded data in the recording region.

16. The optical disk of claim 15, wherein the set of encoded data includes moving picture data.

17. The optical disk of claim 15, wherein the set of encoded data includes sound data.

18. The optical disk of claim 10, wherein the optical disk comprises a recordable disk.

* * * * *